US009754207B2

(12) United States Patent
Allen et al.

(10) Patent No.: US 9,754,207 B2
(45) Date of Patent: Sep. 5, 2017

(54) CORPUS QUALITY ANALYSIS

(71) Applicant: International Business Machines Corporation, Armonk, NY (US)

(72) Inventors: Corville O. Allen, Morrisville, NC (US); Andrew R. Freed, Cary, NC (US); Richard A. Salmon, Apex, NC (US); Beata J. Strack, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 515 days.

(21) Appl. No.: 14/444,690

(22) Filed: Jul. 28, 2014

(65) Prior Publication Data

US 2016/0026634 A1 Jan. 28, 2016

(51) Int. Cl.
G06F 17/30 (2006.01)
G06F 7/00 (2006.01)
G06N 5/02 (2006.01)
G06N 99/00 (2010.01)
G06F 17/27 (2006.01)

(52) U.S. Cl.
CPC ............... G06N 5/02 (2013.01); G06F 17/27 (2013.01); G06N 99/005 (2013.01)

(58) Field of Classification Search
CPC ....................................................... G06N 5/02
See application file for complete search history.

(56) References Cited

U.S. PATENT DOCUMENTS

| 6,076,088 | A  | * | 6/2000  | Paik .................. G06F 17/30707 |
| 6,804,665 | B2 | * | 10/2004 | Kreulen .............. G06F 17/3071 |
| 6,904,428 | B2 |   | 6/2005  | Frieder et al. |
| 7,555,472 | B2 | * | 6/2009  | Craig ....................... G06N 5/02 706/50 |
| 8,423,495 | B1 | * | 4/2013  | Komissarchik ... G06F 17/30719 706/46 |
| 8,577,131 | B1 | * | 11/2013 | Li ......................... G06K 9/6256 382/157 |

(Continued)

FOREIGN PATENT DOCUMENTS

| CN | 102236677 A | 11/2011 |
| EP | 1503338 A3 | 12/2005 |
| WO | WO 2009/140473 A1 | 11/2009 |

OTHER PUBLICATIONS

List of IBM Patents or Patent Applications Treated as Related (Appendix P), 2 pages.

(Continued)

Primary Examiner — Jeffrey A Burke
(74) Attorney, Agent, or Firm — Stephen R. Tkacs; Stephen J. Walder, Jr.; Diana R. Gerhardt

(57) ABSTRACT

A mechanism is provided in a data processing system for corpus quality analysis. The mechanism applies at least one filter to a candidate corpus to determine a degree to which the candidate corpus supplements existing corpora for performing a natural language processing (NLP) operation. Responsive to a determination to add the candidate corpus to the existing corpora based on a result of applying the at least one filter, the mechanism adds the candidate corpus to the existing corpora to form modified corpora. The mechanism performs the NLP operation using the modified corpora.

20 Claims, 7 Drawing Sheets

(56) References Cited

U.S. PATENT DOCUMENTS

| | | | |
|---|---|---|---|
| 8,832,064 B2* | 9/2014 | Stenchikova | G06F 17/279 707/708 |
| 9,251,185 B2* | 2/2016 | Kumar | G06F 17/30303 |
| 2002/0055940 A1* | 5/2002 | Elkan | G06F 17/30867 |
| 2006/0184517 A1 | 8/2006 | Anderson et al. | |
| 2007/0073534 A1* | 3/2007 | Guo | G06F 17/30731 704/9 |
| 2008/0040114 A1 | 2/2008 | Zhou et al. | |
| 2009/0006382 A1* | 1/2009 | Tunkelang | G06F 17/30424 |
| 2009/0077068 A1* | 3/2009 | Aphinyanaphongs | G06F 17/3071 |
| 2009/0287678 A1 | 11/2009 | Brown et al. | |
| 2009/0292687 A1 | 11/2009 | Fan et al. | |
| 2010/0179927 A1 | 7/2010 | Meher et al. | |
| 2010/0191686 A1 | 7/2010 | Wang et al. | |
| 2010/0217742 A1* | 8/2010 | Labrou | G06F 17/30734 706/50 |
| 2011/0066587 A1 | 3/2011 | Ferrucci et al. | |
| 2011/0087656 A1* | 4/2011 | Oh | G06F 17/30654 707/727 |
| 2011/0125734 A1* | 5/2011 | Duboue | G09B 7/00 707/723 |
| 2011/0173210 A1* | 7/2011 | Ahn | G06F 17/30616 707/748 |
| 2011/0218947 A1* | 9/2011 | Vadlamani | G06F 15/18 706/12 |
| 2011/0246465 A1 | 10/2011 | Koister et al. | |
| 2012/0016887 A1 | 1/2012 | Oldham et al. | |
| 2012/0066167 A1* | 3/2012 | Fokoue | G06N 5/02 706/52 |
| 2012/0078895 A1* | 3/2012 | Chu-Carroll | G06F 17/30637 707/728 |
| 2012/0078902 A1 | 3/2012 | Duboue et al. | |
| 2012/0158678 A1 | 6/2012 | McGraw et al. | |
| 2013/0007055 A1 | 1/2013 | Brown et al. | |
| 2013/0018652 A1 | 1/2013 | Ferrucci et al. | |
| 2013/0018876 A1 | 1/2013 | Chu-Carroll et al. | |
| 2013/0066886 A1 | 3/2013 | Bagchi et al. | |
| 2013/0144890 A1 | 6/2013 | Liu | |
| 2013/0212049 A1* | 8/2013 | Maldonado | G06N 99/005 706/12 |
| 2013/0218644 A1* | 8/2013 | Kasravi | G06Q 10/06 705/7.39 |
| 2013/0224714 A1* | 8/2013 | Ajmera | G09B 7/00 434/322 |
| 2014/0006012 A1* | 1/2014 | Zhou | G06F 17/30654 704/9 |
| 2014/0324805 A1* | 10/2014 | Agarwal | G06F 17/30864 707/706 |
| 2015/0026106 A1* | 1/2015 | Oh | G06F 17/3069 706/12 |

OTHER PUBLICATIONS

PCT Notification of Transmittal of the International Search Report and the Written Opinion of the International Searching Authority, or the Declaration (PCT/ISA/220), the International Search Report (PCT/ISA/210) and the Written Opinion of the I International Searching Authority (PCT/ISA/237), dated Sep. 28, 2014, 12 pages.

"SpamBayes", http://spambayes.sourceforge.net/, retrieved from the internet on May 8, 2014, 4 pages.

Han, Eui-Hong et al., "Centroid-Based Document Classification: Analysis & Experiment Results", University of Minnesota, Department of Computer Science/ Army HPC Research Center, Technical Report #00-017, http://lvk.cs.msu.su/~bruzz/articles/classification/han00centroidbased.pdf, Mar. 6, 2000, 15 pages.

High, Rob, "The Era of Cognitive Systems: An Inside Look at IBM Watson and How it Works", IBM Corporation, Redbooks, Dec. 12, 2012, 16 pages.

Yuan, Michael J. , "Watson and healthcare, How natural language processing and semantic search could revolutionize clinical decision support", IBM developerWorks, IBM Corporation, Apr. 12, 2011, 14 pages.

* cited by examiner

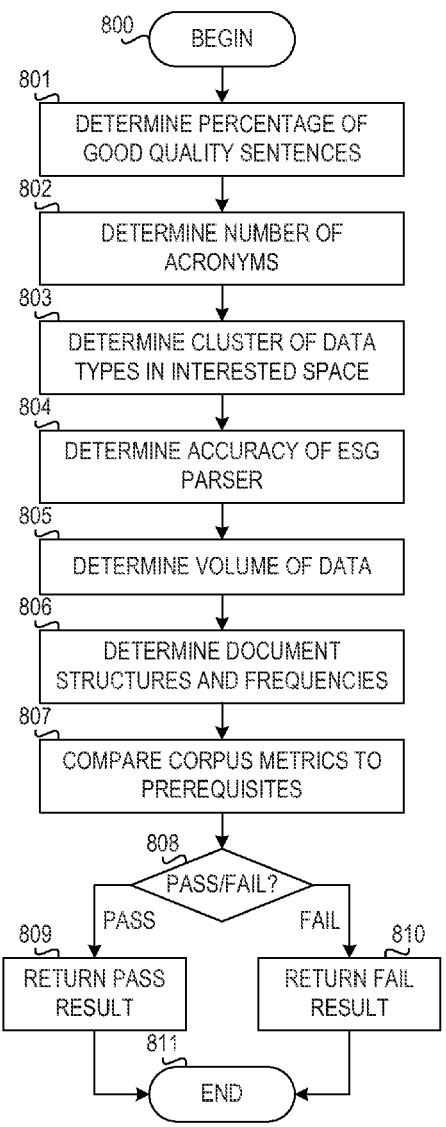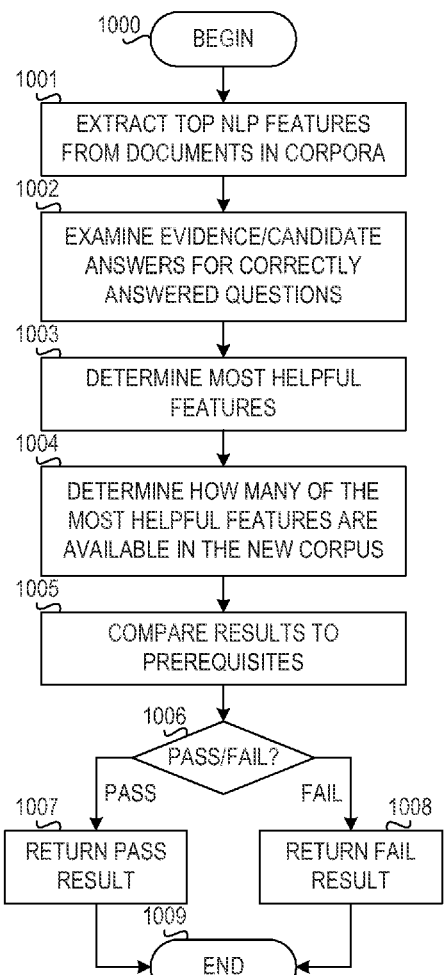
FIG. 8
FIG. 10

CORPUS QUALITY ANALYSIS

BACKGROUND

The present application relates generally to an improved data processing apparatus and method and more specifically to mechanisms for corpus quality analysis.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating Question and Answer (QA) systems, which may take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

One such QA system is the IBM Watson™ system available from International Business Machines (IBM) Corporation of Armonk, N.Y. The IBM Watson™ system is an application of advanced natural language processing, information retrieval, knowledge representation and reasoning, and machine learning technologies to the field of question answering. The IBM Watson™ system is built on IBM's DeepQA™ technology used for hypothesis generation, massive evidence gathering, analysis, and scoring. DeepQA™ takes an input question, analyzes it, decomposes the question into constituent parts, generates one or more hypotheses based on the decomposed question and results of a primary search of answer sources, performs hypothesis and evidence scoring based on a retrieval of evidence from evidence sources, performs synthesis of the one or more hypotheses, and based on trained models, performs a final merging and ranking to output an answer to the input question along with a confidence measure.

Various United States Patent Application Publications describe various types of question and answer systems. U.S. Patent Application Publication No. 2011/0125734 discloses a mechanism for generating question and answer pairs based on a corpus of data. The system starts with a set of questions and then analyzes the set of content to extract answer to those questions. U.S. Patent Application Publication No. 2011/0066587 discloses a mechanism for converting a report of analyzed information into a collection of questions and determining whether answers for the collection of questions are answered or refuted from the information set. The results data are incorporated into an updated information model.

SUMMARY

In one illustrative embodiment, a method is provided in a data processing system, for corpus quality analysis. The method comprises applying at least one filter to a candidate corpus to determine a degree to which the candidate corpus supplements existing corpora for performing a natural language processing (NLP) operation. The method further comprises adding the candidate corpus to the existing corpora to form modified corpora responsive to a determination to add the candidate corpus to the existing corpora based on a result of applying the at least one filter. The method further comprises performing the NLP operation using the modified corpora.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 8 is a flowchart illustrating operation of a mechanism for performing a general corpus metrics filter on a new corpus in accordance with an illustrative embodiment;

FIG. 10 is a flowchart illustrating operation of a mechanism for performing a domain specific corpus filter on a new corpus in accordance with an illustrative embodiment.

DETAILED DESCRIPTION

A question answering system typically has a large corpus of data. When one wishes to augment the corpus, there are two substantial problems. First, one may not know which parts or aspects of the corpus are most useful (e.g., by type, author, or other metric). Secondly, one may not know whether it is worth the time, money, or legal effort to pursue a new data set or how a new data set will benefit results regardless of cost.

The illustrative embodiments provide a mechanism for corpus quality analysis. The embodiments use several techniques to discover the quality of the current corpus. The mechanism considers aspects of the corpus that perform very well and areas for which the corpus performs poorly. By combining the strengths of corpus input types and weaknesses of the current system, the mechanism determines what kinds of corpora to pursue next. The mechanism considers several aspects of a corpus, including general readability, the metadata surrounding the corpus and documents within the corpus, and a domain/content analysis of the corpus itself.

As an enterprise continually licenses growing content, it is prudent to verify the quality of the content in particular circumstances as to whether it will help for a specific set of solutions. The illustrative embodiments determine which corpora are worth licensing and possibly how much to pay for the corpora based on key factors. The mechanism is advantageous for checking content for quality based on machine learned features and key characteristics.

A "mechanism," as used herein, may be an implementation of the functions or aspects of the illustrative embodiments in the form of an apparatus, a procedure, or a computer program product. The mechanisms described herein may be implemented as specialized hardware, software executing on general purpose hardware, software instructions stored on a medium such that the instructions are readily executable by specialized or general purpose hardware, a procedure or method for executing the functions, or a combination of the above.

The above aspects and advantages of the illustrative embodiments of the present invention will be described in greater detail hereafter with reference to the accompanying figures. It should be appreciated that the figures are only intended to be illustrative of exemplary embodiments of the present invention. The present invention may encompass aspects, embodiments, and modifications to the depicted exemplary embodiments not explicitly shown in the figures but would be readily apparent to those of ordinary skill in the art in view of the present description of the illustrative embodiments.

Figure 1:
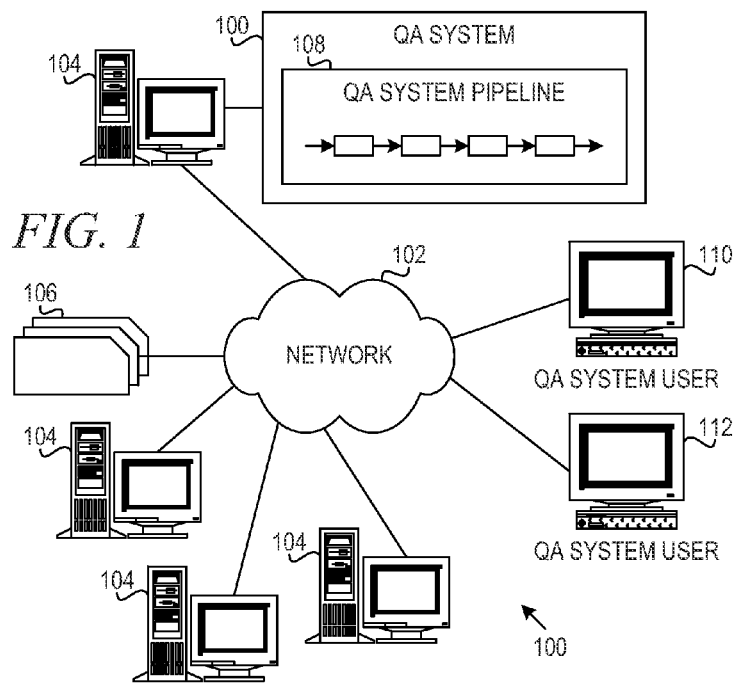
FIG. 1 depicts a schematic diagram of one illustrative embodiment of a question/answer creation (QA) system in a computer network.
Figure 2:
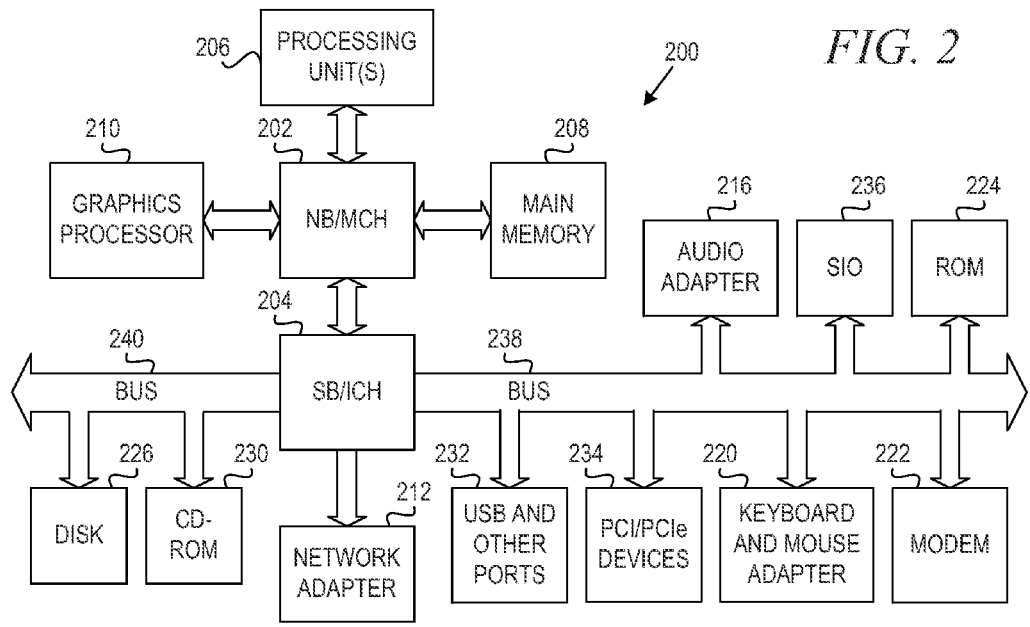
FIG. 2 is a block diagram of an example data processing system in which aspects of the illustrative embodiments may be implemented.
Figure 3:
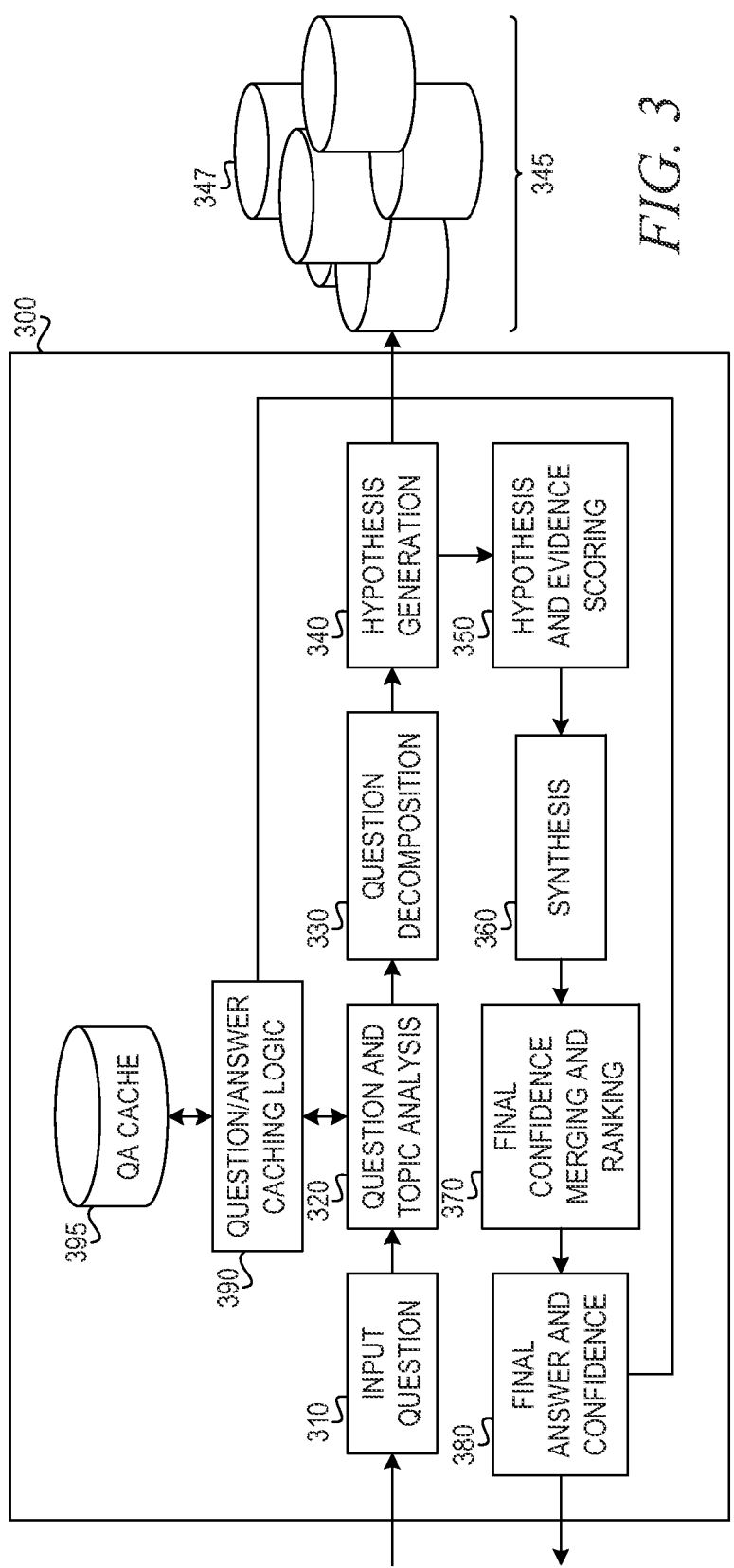
FIG. 3 illustrates a QA system pipeline for processing an input question in accordance with one illustrative embodiment.

FIGS. 1-3 are directed to describing an example Question/Answer, Question and Answer, or Question Answering (QA) system, methodology, and computer program product with which the mechanisms of the illustrative embodiments may be implemented. As will be discussed in greater detail hereafter, the illustrative embodiments may be integrated in, and may augment and extend the functionality of, these QA mechanisms with regard to automatically generating testing/training questions and answers by performing pattern based analysis and natural language processing techniques on the given corpus for quick domain adaptation.

Thus, it is important to first have an understanding of how question and answer creation in a QA system may be implemented before describing how the mechanisms of the illustrative embodiments are integrated in and augment such QA systems. It should be appreciated that the QA mechanisms described in FIGS. 1-3 are only examples and are not intended to state or imply any limitation with regard to the type of QA mechanisms with which the illustrative embodiments may be implemented. Many modifications to the example QA system shown in FIGS. 1-3 may be implemented in various embodiments of the present invention without departing from the spirit and scope of the present invention.

QA mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e., candidate answers.

Content creators, such as article authors, electronic document creators, web page authors, document database creators, and the like, determine use cases for products, solutions, and services described in such content before writing their content. Consequently, the content creators may know what questions the content is intended to answer in a particular topic addressed by the content. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA system. Content creators, automated tools, or the like, annotate or otherwise generate metadata for providing information useable by the QA system to identify these question-and-answer attributes of the content.

Operating on such content, the QA system generates answers for input questions using a plurality of intensive analysis mechanisms, which evaluate the content to identify the most probable answers, i.e., candidate answers, for the input question. The illustrative embodiments leverage the work already done by the QA system to automatically generate testing/training questions and answers by performing pattern based analysis and natural language processing techniques on the given corpus for quick domain adaptation.

FIG. 1 depicts a schematic diagram of one illustrative embodiment of a question/answer creation (QA) system 100 in a computer network 102. One example of a question/answer generation which may be used in conjunction with the principles described herein is described in U.S. Patent Application Publication No. 2011/0125734, which is herein incorporated by reference in its entirety. The QA system 100 may be implemented on one or more computing devices 104 (comprising one or more processors and one or more memories, and potentially any other computing device elements generally known in the art including buses, storage devices, communication interfaces, and the like) connected to the computer network 102. The network 102 includes multiple computing devices 104 in communication with each other and with other devices or components via one or more wired and/or wireless data communication links, where each communication link comprises one or more of wires, routers, switches, transmitters, receivers, or the like. The QA system 100 and network 102 enable question/answer (QA) generation functionality for one or more QA system users via their respective computing devices 110, 112. Other embodiments of the QA system 100 may be used with components, systems, sub-systems, and/or devices other than those that are depicted herein.

The QA system 100 may be configured to implement a QA system pipeline 108 that receive inputs from various sources. For example, the QA system 100 may receive input from the network 102, a corpus of electronic documents 106, QA system users, or other data and other possible sources of input. In one embodiment, some or all of the inputs to the QA system 100 is routed through the network 102. The various computing devices 104 on the network 102 include access points for content creators and QA system users. Some of the computing devices 104 include devices for a database storing the corpus of data 106 (which is shown as a separate entity in FIG. 1 for illustrative purposes only). Portions of the corpus of data 106 may also be provided on one or more other network attached storage devices, in one or more databases, or other computing devices not explicitly shown in FIG. 1. The network 102 includes local network connections and remote connections in various embodiments, such that the QA system 100 may operate in environments of any size, including local and global, e.g., the Internet.

In one embodiment, the content creator creates content in a document of the corpus of data 106 for use as part of a corpus of data with the QA system 100. The document includes any file, text, article, or source of data for use in the QA system 100. QA system users access the QA system 100 via a network connection or an Internet connection to the network 102, and input questions to the QA system 100 to be answered by the content in the corpus of data 106. In one embodiment, the questions are formed using natural language. The QA system 100 interprets the question and provide a response to the QA system user, e.g., QA system user 110, containing one or more answers to the question. In some embodiments, the QA system 100 provides a response to users in a ranked list of candidate answers.

The QA system 100 implements a QA system pipeline 108, which comprises a plurality of stages for processing an input question, the corpus of data 106, and generating answers for the input question based on the processing of the corpus of data 106. The QA system pipeline 108 will be described in greater detail hereafter with regard to FIG. 3.

In some illustrative embodiments, the QA system 100 may be the IBM Watson™ QA system available from International Business Machines Corporation of Armonk, N.Y., which is augmented with the mechanisms of the illustrative embodiments described hereafter. The IBM Watson™ QA system receives an input question, which it then parses to extract the major features of the question, which in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms look at the matching of terms and synonyms within the language of the input question and the found portions of the corpus of data. Other reasoning algorithms look at temporal or spatial features in the language, while others evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model is then used to summarize a level of confidence that the IBM Watson™ QA system has regarding the evidence that the potential response, i.e., candidate answer, is inferred by the question. This process is repeated for each of the candidate answers until the IBM Watson™ QA system identifies candidate answers that surface as being significantly stronger than others and thus, generates a final answer, or ranked set of answers, for the input question. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

FIG. 2 is a block diagram of an example data processing system in which aspects of the illustrative embodiments may be implemented. Data processing system 200 is an example of a computer, such as server 104 or client 110 in FIG. 1, in which computer usable code or instructions implementing the processes for illustrative embodiments of the present invention may be located. In one illustrative embodiment, FIG. 2 represents a server computing device, such as a server 104, which, which implements a QA system 100 and QA system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 is connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 use, for example, an integrated drive electronics (IDE) or serial advanced technology attachment (SATA) interface. Super I/O (SIO) device 236 is connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 illustrates a QA system pipeline for processing an input question in accordance with one illustrative embodiment. The QA system pipeline of FIG. 3 may be implemented, for example, as QA system pipeline 108 of QA system 100 in FIG. 1. It should be appreciated that the stages of the QA system pipeline shown in FIG. 3 may be implemented as one or more software engines, components, or the like, which are configured with logic for implementing the functionality attributed to the particular stage. Each stage may be implemented using one or more of such software engines, components or the like. The software engines, components, etc. may be executed on one or more processors of one or more data processing systems or devices and may utilize or operate on data stored in one or more data storage devices, memories, or the like, on one or more of the data processing systems. The QA system pipeline of FIG. 3 may be augmented, for example, in one or more of the stages to implement the improved mechanism of the illustrative embodiments described hereafter, additional stages may be provided to implement the improved mechanism, or separate logic from the pipeline 300 may be provided for interfacing with the pipeline 300 and implementing the improved functionality and operations of the illustrative embodiments.

As shown in FIG. 3, the QA system pipeline 300 comprises a plurality of stages 310-380 through which the QA system operates to analyze an input question and generate a final response. In an initial question input stage 310, the QA system receives an input question that is presented in a natural language format. That is, a user may input, via a user interface, an input question for which the user wishes to obtain an answer, e.g., "Who are Washington's closest advisors?" In response to receiving the input question, the next stage of the QA system pipeline 300, i.e. the question and topic analysis stage 320, parses the input question using natural language processing (NLP) techniques to extract major features from the input question, classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

The identified major features are then used during the question decomposition stage 330 to decompose the question into one or more queries to be applied to the corpora of data/information 345 in order to generate one or more hypotheses. The queries are generated in any known or later developed query language, such as the Structure Query Language (SQL), or the like. The queries are applied to one or more databases storing information about the electronic texts, documents, articles, websites, and the like, that make up the corpora of data/information 345. That is, these various sources themselves, different collections of sources, and the like, represent a different corpus 347 within the corpora 345.

There may be different corpora 347 defined for different collections of documents based on various criteria depending upon the particular implementation. For example, different corpora may be established for different topics, subject matter categories, sources of information, or the like. As one example, a first corpus is associated with healthcare documents while a second corpus is associated with financial documents. Alternatively, one corpus comprises documents published by the U.S. Department of Energy while another corpus comprises IBM Redbooks documents. Any collection of content having some similar attribute is considered to be a corpus 347 within the corpora 345.

As used herein, a "domain" is a technical, professional, or academic field having a corresponding corpus or source of information. For instance, one domain is a healthcare domain where a corresponding corpus for the domain includes healthcare documents and another domain is a financial domain where a corresponding corpus for the financial domain is a collection of financial documents.

The queries are applied to one or more databases storing information about the electronic texts, documents, articles, websites, and the like, that make up the corpus of data/information, e.g., the corpus of data 106 in FIG. 1. The queries being applied to the corpus of data/information at the hypothesis generation stage 340 to generate results identifying potential hypotheses for answering the input question which can be evaluated. That is, the application of the queries results in the extraction of portions of the corpus of data/information matching the criteria of the particular query. These portions of the corpus are then be analyzed and used, during the hypothesis generation stage 340, to generate hypotheses for answering the input question. These hypotheses are also referred to herein as "candidate answers" for the input question. For any input question, at this stage 340, there may be hundreds of hypotheses or candidate answers generated that need to be evaluated.

The QA system pipeline 300, in stage 350, then performs a deep analysis and comparison of the language of the input question and the language of each hypothesis or "candidate answer" as well as performs evidence scoring to evaluate the likelihood that the particular hypothesis is a correct answer for the input question. As mentioned above, this may involve using a plurality of reasoning algorithms, each performing a separate type of analysis of the language of the input question and/or content of the corpus that provides evidence in support of, or not, of the hypothesis. Each reasoning algorithm generates a score based on the analysis it performs, which indicates a measure of relevance of the individual portions of the corpus of data/information extracted by application of the queries as well as a measure of the correctness of the corresponding hypothesis, i.e., a measure of confidence in the hypothesis.

In the synthesis stage 360, the many relevance scores generated by the various reasoning algorithms are synthesized into confidence scores for the various hypotheses. This process involves applying weights to the various scores, where the weights have been determined through training of the statistical model employed by the QA system and/or dynamically updated, as described hereafter. The weighted scores are processed in accordance with a statistical model generated through training of the QA system that identifies a manner by which these scores are combined to generate a confidence score or measure for the individual hypotheses or candidate answers. This confidence score or measure summarizes the level of confidence that the QA system has about the evidence that the candidate answer is inferred by the input question, i.e., that the candidate answer is the correct answer for the input question.

The resulting confidence scores or measures are processed by a final confidence merging and ranking stage 370 which compares the confidence scores and measures, compare them against predetermined thresholds, or perform any other analysis on the confidence scores to determine which hypotheses/candidate answers are the most likely to be the answer to the input question. The hypotheses/candidate answers are ranked according to these comparisons to generate a ranked listing of hypotheses/candidate answers (hereafter simply referred to as "candidate answers"). From the ranked listing of candidate answers, at stage 380, a final answer and confidence score, or final set of candidate answers and confidence scores, are generated and output to the submitter of the original input question.

After stage 380, or as part of stage 380, the set of candidate answers is output via a graphical user interface, which provides the user with tools for collaborating with the QA system to review, evaluate, and modify the listing of candidate answers and the evidence associated with these candidate answers that is evaluated by the QA system. That is, at stage 390, the graphical user interface engine not only receives the final ranked listing of candidate answers generated by the QA system pipeline 300, but also receives the underlying evidence information for each of the candidate answers from the hypothesis and evidence scoring stage 350, and uses this information to generate a graphical user interface outputting the ranked listing of candidate answers and an output of the selected portions of the corpus of data/information that supports, and/or detracts, from the candidate answers being the correct answer for the input question, referred to hereafter as the "evidence passages." Stage 390 may also cache candidate answers and evidence in QA cache 395 to more quickly provide answers and supporting evidence for recently or frequently asked questions.

The illustrative embodiments provide a mechanism for corpus quality analysis. When considering a new corpus, such as corpus 347 being added to corpora 345, the mechanism runs the corpus through three filters of increasing specificity in order to determine whether the corpus will be useful.

Figure 4:
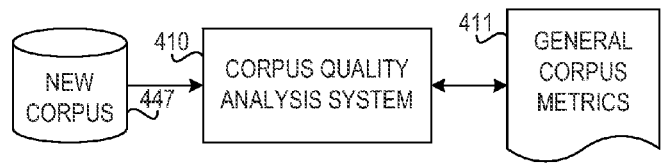
FIG. 4 is a block diagram illustrating a mechanism for performing a general corpus metrics filter on a new corpus in accordance with an illustrative embodiment.

FIG. 4 is a block diagram illustrating a mechanism for performing a general corpus metrics filter on a new corpus in accordance with an illustrative embodiment. In a first filter, a corpus quality analysis system 410 analyzes basic conditions of new corpus 447. Essentially, corpus quality analysis system 410 determines whether new corpus 447 is "legible" enough that a natural language system used for document ingestion will be able to extract knowledge from new corpus 447 without too much work.

Natural language processing (NLP) is a field of computer science, artificial intelligence, and linguistics concerned with the interactions between computers and human (natural) languages. As such, NLP is related to the area of human-computer interaction. Many challenges in NLP involve natural language understanding, that is, enabling computers to derive meaning from human or natural language input, and others involve natural language generation. Thus, corpus quality analysis system 410 and document ingestion systems (not shown) are systems that process human input in a natural language to derive meaning and understanding on some level. In one particular embodiment, an NL system is a question answering (QA) system as described above; however, an NL system need not be the same system as a QA system.

In particular embodiments, NL systems, such as corpus quality analysis system 410 or document ingestion systems, use a pipeline of software engines, also referred to as annotation engines (AEs), to parse and/or annotate natural language input to identify features. There may be hundreds or even thousands of annotation engines applied, each of which performs different analysis, e.g., comparisons, and generates a score. For example, some annotation engines identify terms and synonyms within the language of an input document. Other annotation engines look at temporal or spatial features in the language, while others evaluate the source of the portion of the corpus of data and evaluate its veracity. Still other annotation engines examine metadata of an input document to identify author, date of publication, or whether the document was published by a university, for example.

In the depicted example, corpus quality analysis system 410 analyzes new corpus 447 to determine the following:
whether documents contain good quality sentences;
number of acronyms;

cluster of data types in the interested space;
domain cluster of information;
accuracy of English Slot Grammar (ESG) parser;
volume of data; and
document structure and features.

Documents with good quality sentences are more likely to be parsed correctly and to produce meaningful results. On the other hand, documents that use many acronyms or include many lists or other structures that are difficult to parse are less likely to be parsed correctly or to produce meaningful results.

Cluster analysis or clustering is the task of grouping a set of objects in such a way that objects in the same group are more similar to each other than to those in other groups. Cluster analysis is a main task of exploratory data mining and a common technique for statistical data analysis used in machine learning. Corpus quality analysis system 410 performs cluster analysis on new corpus 447 to determine whether text objects in documents are clustered into the information space or domain of the current system. If text objects in documents of new corpus 447 do not cluster into meaningful areas of interest within the domain of the system, then the new corpus 447 is not likely to be useful.

English Slot Grammar (ESG) is a deep parser in the sense that parse trees it produces for a sentence show a level of logical analysis or deep structure. However, each parse tree also shows a surface-level grammatical structure along with the deep structure. The parse trees for a segment are ranked according to a parse scoring system. A parse score roughly corresponds to the likelihood that the parse is a correct one. If the documents in new corpus 447 yield low parse scores, then the grammatical structures of sentences in those documents are unlikely to yield useful results.

Corpus quality analysis system 410 collects general corpus metrics 411 including the above listed basic conditions. Corpus quality analysis system 410 compares general corpus metrics 411 to prerequisites for accepting a new corpus. If the new corpus 447 does not meet the prerequisites, corpus quality analysis system 410 rejects new corpus 447. If new corpus 447 does meet the prerequisites, corpus quality analysis system 410 returns a pass result, which sends corpus 447 to the second stage filter.

Figure 5A:
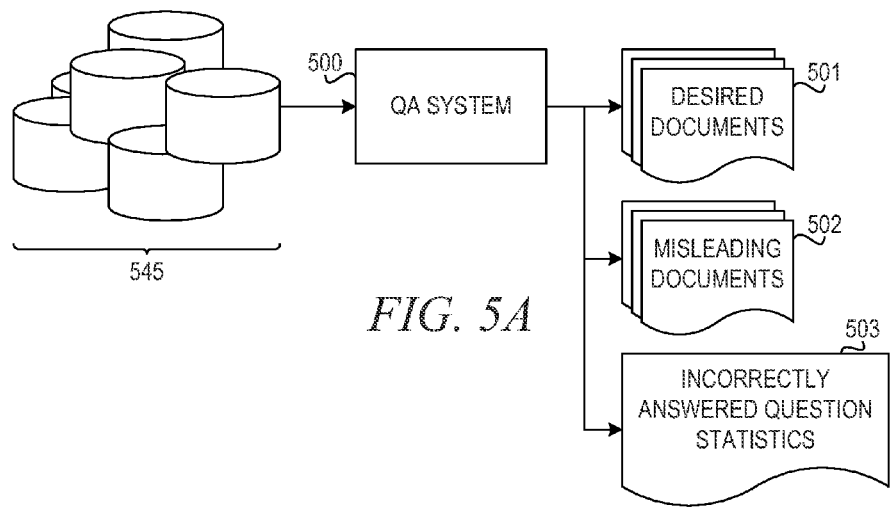
FIGS. 5A-5E are block diagrams illustrating a mechanism for performing a summarization of corpus filter on a new corpus in accordance with an illustrative embodiment.

FIGS. 5A-5E are block diagrams illustrating a mechanism for performing a summarization of corpus filter on a new corpus in accordance with an illustrative embodiment. The summarization of corpus stage is performed to employ the knowledge about the current system and corpus in the process of making a decision about whether to purchase and/or incorporate a new corpus. FIG. 5A illustrates a mechanism for labeling documents while current corpora 545 are in use. In the process of providing answers to input questions, question answering (QA) system 500 labels documents in corpora 545 into two groups: (A) documents that show up as evidence for answers with high confidence (desired documents 501), i.e., the document frequently shows up as supporting evidence that a generated answer is correct; and, (B) documents that show up as evidence for incorrect answers (misleading documents 502), i.e., the document shows up as evidence more often for incorrect answers than for correct answers.

The group of desired documents 501 contains trustworthy and valuable documents. The group of misleading documents 502 contains documents that may harm performance of the QA system no matter how well designed the system is. Misleading documents 502 may contain conference abstracts or papers that were not peer reviewed, types of studies that do not provide reliable results, or papers that report results that are outdated or invalidated (e.g., additional side effects were found for a drug).

In addition to collecting information about documents, QA system 500 collects statistics 503 about the scope or type of incorrectly answered questions, referred to herein as challenging questions. QA system 500 collects statistics 503 to identify areas where the corpora 545 may need improvement. These areas can include, but are not limited to, domain of the question, or vocabulary in the question (or in answer from answer key). For example, if QA system 500 answers questions about acute leukemia wrong, then a corpus with new documents containing references to acute leukemia may be helpful.

Figure 5B:
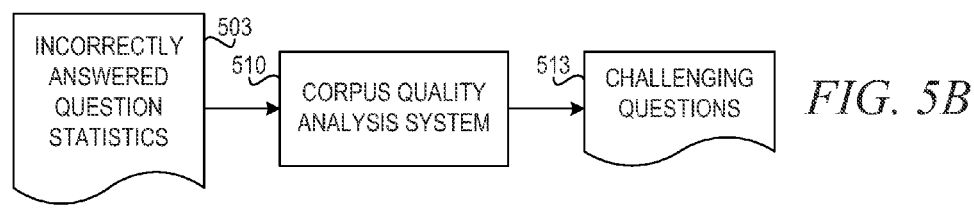

As shown in FIG. 5B, corpus quality analysis system 510 receives incorrectly answered question statistics 503 and generates a list of challenging questions 513. If a new corpus provides reliable evidence for answering challenging questions 513, then that corpus may be useful to the current system.

Figure 5C:
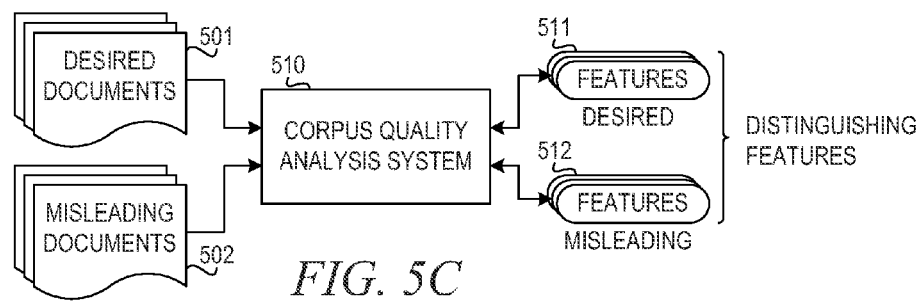

FIG. 5C illustrates a mechanism for determining features for identifying desired and misleading documents. Corpus quality analysis system 510 receives desired documents 501 and misleading documents 502. Corpus quality analysis system 510 extracts features of documents in desired documents 501 and misleading documents 502. In one example embodiment, corpus quality analysis system 510 extracts these features from descriptors of the documents in metadata rather than from the document content treated as NLP objects. Examples of such features include, for example, author, number of authors, type of document, date of publication, affiliation of authors, or any domain specific attributes such as type of studies (blind, double blind), keywords, etc. One may define the features to extract upfront, or corpus quality analysis system 510 may extract the features automatically.

Corpus quality analysis system 510 determines which features differentiate best between desired documents 501 and misleading documents 502. In one embodiment, corpus quality analysis system 510 uses a machine learning (ML) technique, such as Random Forest, which is an ensemble learning method for classification and regression that operates by constructing a multitude of decision trees at training time and outputting the class that is the mode of the classes output by individual trees. As a result of determining the distinguishing features, corpus quality analysis system 510 generates desired features 511 and misleading features 512 and their values that describe desired documents and misleading documents, respectively. For example, features 511 may indicate documents published after 2011 or documents affiliated with Ivy League universities.

Figure 5D:
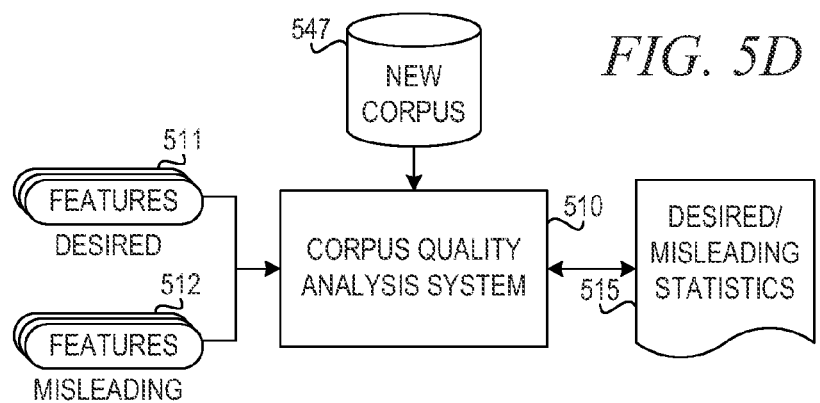

FIG. 5D illustrates a mechanism for determining desired/misleading statistics. Corpus quality analysis system 510 determines the fraction of the documents in new corpus 547 that match the desired features 511 and the fraction of the documents in new corpus 547 that match the misleading features 512. Corpus quality analysis system 510 then produces desired/misleading statistics 515, which corpus quality analysis system 510 compares to prerequisites. If the desired/misleading statistics 515 compare favorably to the prerequisites, then new corpus 547 contains a sufficiently high number of desired documents and an adequately low number of misleading documents.

Figure 5E:
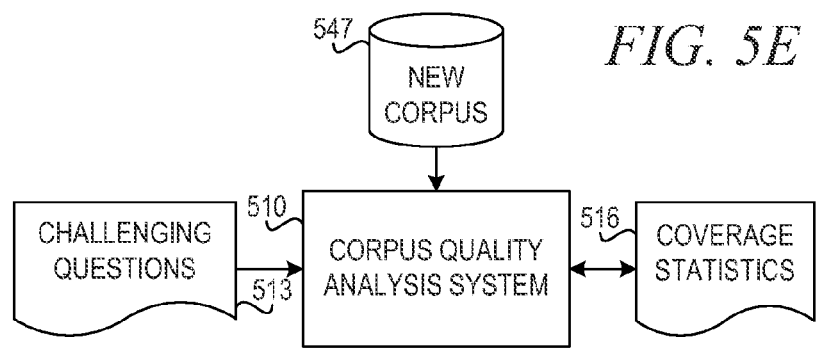

FIG. 5E illustrates a mechanism for determining coverage of challenging questions. Also as part of the second stage filter, corpus quality analysis system 510 determines the fraction of the documents in new corpus 547 that cover challenging questions 513 and the fraction of desired documents in new corpus 547 that cover challenging questions 513. In one embodiment, challenging questions 513 are generated as described above with reference to FIG. 5A by continuously collecting data while the current corpora are in use. In an alternative embodiment, challenging questions 513 are generated manually or using an automated question generation technique.

In one embodiment, corpus quality analysis system 510 determines coverage for challenging questions 513 by running challenging questions 513 through a question answering system using new corpus 547 as the information source. If documents in new corpus 547 show up as evidence for high confidence answers to a given challenging question, then the given question is considered to be covered. In alternative embodiments, corpus quality analysis system 510 simply determines whether features or keywords from challenging questions 513 are present within documents in new corpus 547.

Corpus quality analysis system 510 then produces coverage statistics 516, which corpus quality analysis system 510 compares to prerequisites. If the coverage statistics 516 compare favorably to the prerequisites, then new corpus 547 contains content that supplements the existing corpora.

Analyzing the desired/misleading statistics 515 and coverage statistics 516 allows for making a more educated decision about whether to include the new corpus. If the new corpus 547 does not meet the prerequisites, corpus quality analysis system 510 rejects new corpus 547. If new corpus 547 does meet the prerequisites, corpus quality analysis system 510 returns a pass result, which sends corpus 547 to the third stage filter.

Figure 6:
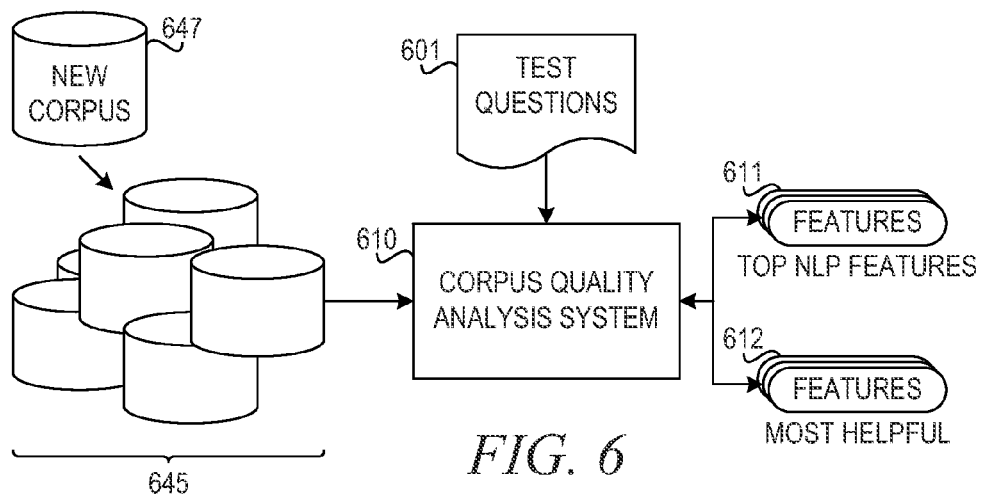
FIG. 6 is a block diagram illustrating a mechanism for performing a domain specific corpus filter on a new corpus in accordance with an illustrative embodiment.

FIG. 6 is a block diagram illustrating a mechanism for performing a domain specific corpus filter on a new corpus in accordance with an illustrative embodiment. In this filter, corpus quality analysis system 610 analyzes the entirety of the present corpora 645, including new corpus 647, and extracts the top NLP features 611 from the documents. For example, in a medical domain the features could be anemia, antibiotics, fever, etc. Corpus quality analysis system 610 then processes test questions 601 and examines the evidence/candidate answers for the questions answered correctly and incorrectly and uses a learning model to determine the most helpful features 612.

Corpus quality analysis system 610 determines how many of the top features from features 611 and features 612 occur in new corpus 647. If new corpus 647 contains most or all of these top features, then corpus 647 is a strong candidate for inclusion into the QA system, because new corpus 647 is very likely to supplement and enhance the effectiveness of corpora 645.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 7:
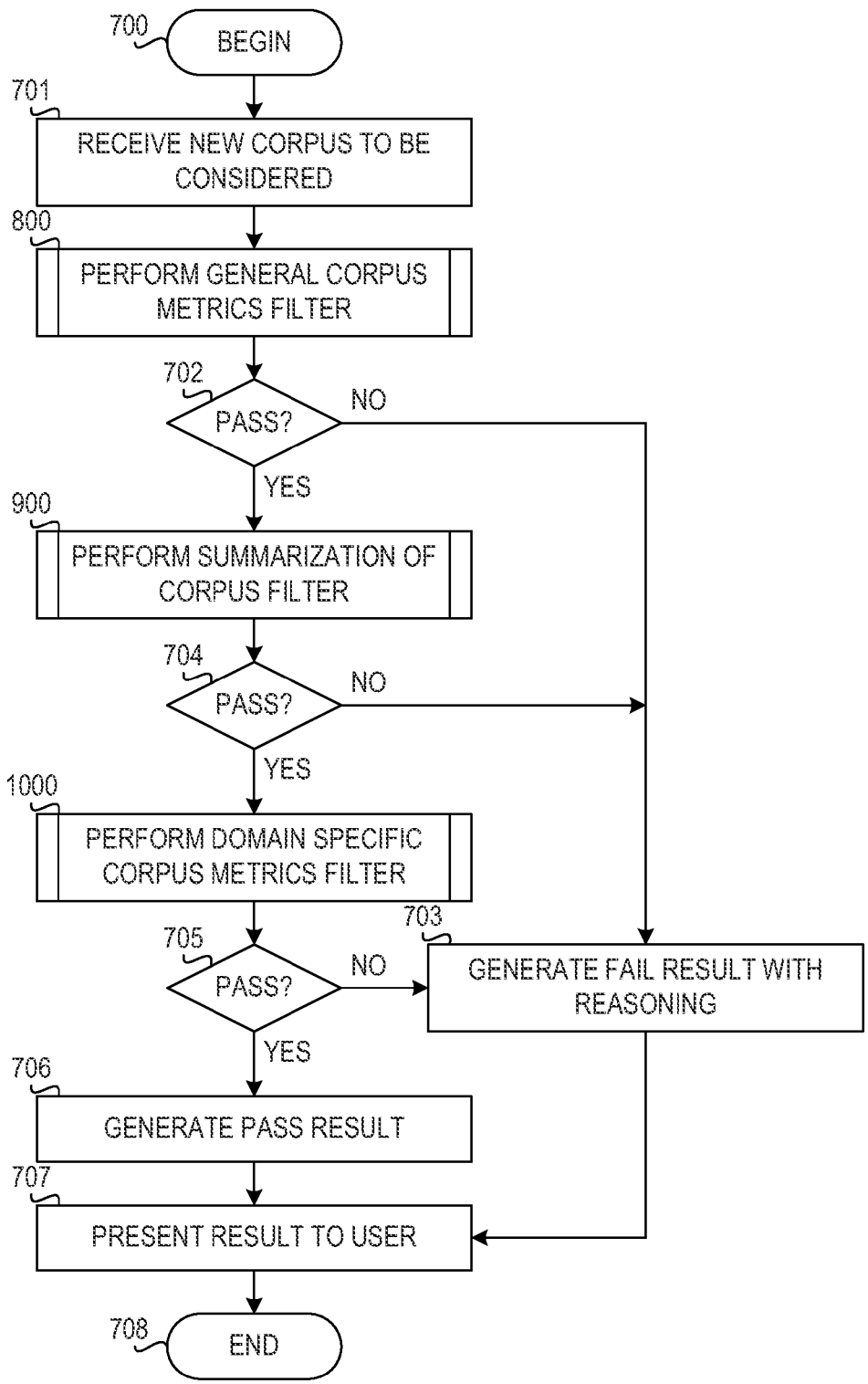
FIG. 7 is a flowchart illustrating operation of a mechanism for corpus quality analysis in accordance with an illustrative embodiment.

FIG. 7 is a flowchart illustrating operation of a mechanism for corpus quality analysis in accordance with an illustrative embodiment. Operation begins (block 700), and the mechanism receives a new corpus to be considered for addition to corpora for a question answering (QA) system (block 701). In a first stage, the mechanism performs a general corpus metrics filter (block 800). Operation of the general corpus metrics filter is described below with reference to FIG. 8. The mechanism determines whether the new corpus passes the general corpus metrics filter (block 702). If the new corpus does not pass the general corpus metrics filter, then the mechanism generates a fail result with reasoning (block 703).

If the new corpus passes the general corpus metrics filter in block 702, then the mechanism performs a summarization of corpus filter (block 900) in a second stage. Operation of the summarization of corpus filter is described below with reference to FIG. 9. The mechanism determines whether the new corpus passes the summarization of corpus filter (block 704). If the new corpus does not pass the summarization of corpus filter, then the mechanism generates a fail result with reasoning (block 703).

If the new corpus passes the summarization of corpus filter in block 704, then the mechanism performs a domain specific corpus metrics filter (block 1000) in a third stage. Operation of the domain specific corpus metrics filter is described below with reference to FIG. 10. The mechanism determines whether the new corpus passes the domain specific corpus metrics filter (block 705). If the new corpus does not pass the domain specific corpus metrics filter, then the mechanism generates a fail result with reasoning (block 703). If the new corpus passes the domain specific corpus metrics filter in block 705, then the mechanism generates a pass result (block 706).

The mechanism presents the result generated in block 703 or block 706 to the user (block 707). Thereafter, operation ends (block 708). In one embodiment, presentation of a fail result includes information regarding which filter resulted in the fail result, for what metrics or areas of coverage the corpus was found to be deficient, identification of documents that were found to be misleading, or other information pertaining to reasons for failure. In one example embodiment, presentation of a fail result also includes information regarding metrics or areas for which the new corpus performed well. In an example embodiment, presentation of a pass result includes information regarding areas for which the new corpus provides coverage, identification of desired documents in the new corpus, top features of the new corpus, or other information pertaining to reasons the new corpus would be a valuable asset.

FIG. 8 is a flowchart illustrating operation of a mechanism for performing a general corpus metrics filter on a new corpus in accordance with an illustrative embodiment. Operation begins (block 800) when the mechanism receives a new corpus, and the mechanism determines a percentage of good quality sentences in the new corpus (block 801). The mechanism determines a number of acronyms (block 802). The mechanism determines a cluster of data types in the interested space (block 803). Then, the mechanism determines an accuracy of English Slot Grammar (ESG) parser (block 804). The mechanism then determines volume of data (block 805). The mechanism also determines document structures and frequencies (block 806).

Next, the mechanism compares the determined corpus metrics to prerequisites (block 807). The mechanism then determines whether the new corpus passes the filter based on the comparison (block 808). If the corpus passes the filter, then the mechanism returns a pass result (block 809). If the corpus fails the filter, then the mechanism returns a fail result (block 810). Thereafter, operation ends (block 811).

Figure 9:
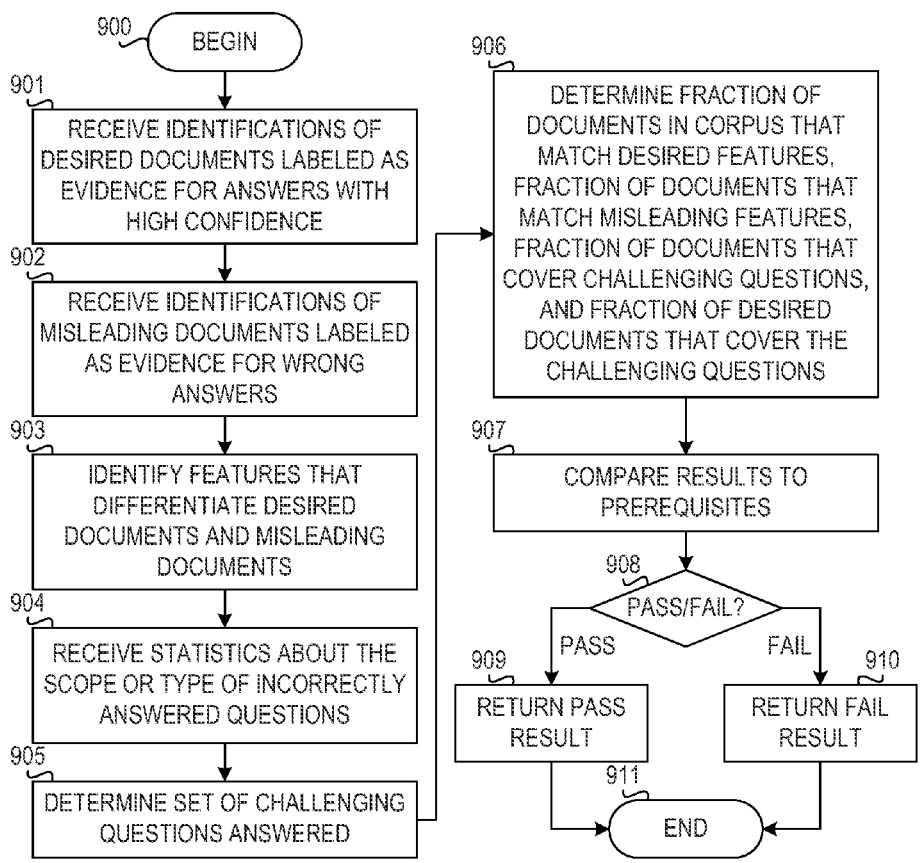
FIG. 9 is a flowchart illustrating operation of a mechanism for performing a summarization of corpus filter on a new corpus in accordance with an illustrative embodiment.

FIG. 9 is a flowchart illustrating operation of a mechanism for performing a summarization of corpus filter on a new corpus in accordance with an illustrative embodiment. Operation begins (block 900) when the mechanism receives a new corpus, and the mechanism receives identifications of desired documents labeled as evidence for answers with high confidence (block 901). The mechanism receives identifications of misleading documents labeled evidence for wrong answers (block 902). The mechanism then identifies features that differentiate desired documents and misleading documents (block 903).

Next, the mechanism receives statistics about the scope or type of incorrectly answered questions (block 904). The mechanism determines a set of challenging questions answered by the new corpus (block 905). For the new corpus, the mechanism determines the fraction of documents in the corpus that match desired features, the fraction of documents that match misleading features, the fraction of documents that cover challenging questions, and the fraction of desired documents that cover the challenging questions (block 906).

The mechanism then compares the above summarization of corpus metrics to prerequisites (block 907). The mechanism determines whether the new corpus passes the filter based on the comparison (block 908).). If the corpus passes the filter, then the mechanism returns a pass result (block 909). If the corpus fails the filter, then the mechanism returns a fail result (block 910). Thereafter, operation ends (block 911).

FIG. 10 is a flowchart illustrating operation of a mechanism for performing a domain specific corpus filter on a new corpus in accordance with an illustrative embodiment. Operation begins (block 1000) when the mechanism receives a new corpus, and the mechanism extracts top natural language processing (NLP) features from documents in the current corpora combined with the new corpus (block 1001). The mechanism examines evidence and candidate answers for correctly and incorrectly answered questions (block 1002). The mechanism determines the most helpful features for answering questions (block 1003).

The mechanism determines how many of the most helpful features are available in the new corpus (block 1004). The mechanism compares the results to prerequisites (block 1005). The mechanism determines whether the new corpus passes the filter based on the comparison (block 1006).). If the corpus passes the filter, then the mechanism returns a pass result (block 1007). If the corpus fails the filter, then the mechanism returns a fail result (block 1008). Thereafter, operation ends (block 1009).

Thus, the illustrative embodiments provide a mechanism for corpus quality analysis. The mechanism uses three stages of filters. A first filter considers general corpus metrics. This is a quality metric against the type of information and how that information can be extracted accurately. A second filter summarizes the corpus based on its inclusion and relevance to answers to a training set. This is matched against documents being included for wrong answers (misleading documents). Looking at the metadata for these documents and acknowledging the features that are different between the correct corpus documents (high confidence and desired) compared to misleading documents. A third filter incorporates domain specific corpus metrics where for a given answer, the key features for a set of training questions and answers are recognized and mapped across evidence (corpus) that matches.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for corpus quality analysis, the method comprising:
    applying at least one filter to a candidate corpus to determine a degree to which the candidate corpus supplements existing corpora for performing a natural language processing (NLP) operation, wherein the at least one filter comprises a first filter to determine whether the candidate corpus contains documents having attributes that match a set of evidence documents that are known to provide high-confidence evidence and contains documents that cover a set of questions not sufficiently covered by the current corpora, wherein applying the first filter comprises:
        determining desired features associated with high-confidence evidence documents within the current corpora;
        determining misleading features associated with misleading documents within the current corpora, wherein the misleading documents provide evidence for low-confidence or incorrect answers;
        determining a fraction of documents in the candidate corpus that match the desired features and a fraction of documents in the candidate corpus that match the misleading features; and
        comparing the fraction of documents in the candidate corpus that match the desired features and the fraction of documents in the candidate corpus that match the misleading features to a set of prerequisites for adding the candidate corpus to the existing corpora;
    responsive to a determination to add the candidate corpus to the existing corpora based on a result of applying the at least one filter, adding the candidate corpus to the existing corpora to form modified corpora; and
    performing the NLP operation using the modified corpora.

2. The method of claim 1, wherein the at least one filter comprises a second filter to determine whether information can be extracted accurately from the new corpus based on general quality metrics of the candidate corpus.

3. The method of claim 2, wherein applying the second filter comprises:
    collecting the general quality metrics from the candidate corpus, wherein the general quality metrics comprise at least one of a number of good quality sentences, a number of acronyms, cluster of data types in an interested space, accuracy of an English Slot Grammar parser, a volume of data, or document structures; and
    comparing the general quality metrics to a set of prerequisites for adding the candidate corpus to the existing corpora.

4. The method of claim 1, wherein determining features associated with high-confidence evidence documents within the current corpora comprises labeling desired documents in the current corpora that show up as evidence for answers with high confidence and extracting features from metadata of the labeled desired documents to form the desired features; and wherein determining misleading features associated with misleading documents within the current corpora comprises labeling misleading documents in the current corpora that show up as evidence for incorrect answers and extracting features from metadata of the labeled misleading documents to form the misleading features.

5. The method of claim 1, wherein applying the first filter further comprises:

collecting statistics about scope or type of incorrectly answered questions using the current corpora;
generating the set of questions based on the statistics;
determining a fraction of documents in the candidate corpus that cover the set of questions; and
comparing the fraction of documents in the candidate corpus that cover the set of questions to the set of prerequisites for adding the candidate corpus to the existing corpora.

6. The method of claim 1, wherein applying the first filter further comprises determining a fraction of documents in the candidate corpus that match the desired features and cover the set of questions and comparing the fraction of documents in the candidate corpus that match the desired features and cover the set of questions to the set of prerequisites for adding the candidate corpus to the existing corpora.

7. The method of claim 1, wherein the at least one filter comprises a third filter to determine whether documents in the candidate corpus contain NLP features known to be helpful for performing the NLP operation.

8. The method of claim 7, wherein applying the third filter comprises:

extracting a set of the most frequent NLP features from a combination of the current corpora and candidate corpus;
examining evidence and candidate answers for questions answered correctly and incorrectly using the combination of the current corpora and candidate corpus;
determining a set of most effective features from the set of the most frequent NLP features using a machine learning model based on the evidence and candidate answers;
determining a number of the set of most effective features that are present in the candidate corpus; and
comparing the number of the set of most effective features that are present in the candidate corpus to the set of prerequisites for adding the candidate corpus to the existing corpora.

9. The method of claim 1, wherein the at least one filter comprises a fourth filter to determine whether information can be extracted accurately from the new corpus based on general quality metrics of the candidate corpus, a fifth filter to determine whether the candidate corpus contains documents having attributes that match a set of evidence documents that are known to provide high-confidence evidence and contains documents that cover a set of questions not sufficiently covered by the current corpora, and a sixth filter to determine whether documents in the candidate corpus contain NLP features known to be helpful for performing the NLP operation.

10. The method of claim 9, wherein applying the at least one filter comprises:

applying the fourth filter to the candidate corpus; and
responsive to the candidate corpus not passing the fourth filter, determining not to add the candidate corpus to the existing corpora.

11. The method of claim 10, wherein applying the at least one filter further comprises:

responsive to the candidate corpus passing the fourth filter, applying the fifth filter to the candidate corpus; and
responsive to the candidate corpus not passing the fifth filter, determining not to add the candidate corpus to the existing corpora.

12. The method of claim 11, wherein applying the at least one filter further comprises:

responsive to the candidate corpus passing the fifth filter, applying the sixth filter to the candidate corpus; and
responsive to the candidate corpus not passing the sixth filter, determining not to add the candidate corpus to the existing corpora.

13. A computer program product comprising a computer readable storage medium having a computer readable program stored therein, wherein the computer readable program, when executed on a question answering system, causes the question answering system to:

apply at least one filter to a candidate corpus to determine a degree to which the candidate corpus supplements existing corpora for performing a natural language processing (NLP) operation, wherein the at least one filter comprises a first filter to determine whether the candidate corpus contains documents having attributes that match a set of evidence documents that are known to provide high-confidence evidence and contains documents that cover a set of questions not sufficiently covered by the current corpora, wherein applying the first filter comprises:

determining desired features associated with high-confidence evidence documents within the current corpora;
determining misleading features associated with misleading documents within the current corpora, wherein the misleading documents provide evidence for low-confidence or incorrect answers;
determining a fraction of documents in the candidate corpus that match the desired features and a fraction of documents in the candidate corpus that match the misleading features; and
comparing the fraction of documents in the candidate corpus that match the desired features and the fraction of documents in the candidate corpus that match the misleading features to a set of prerequisites for adding the candidate corpus to the existing corpora;
responsive to a determination to add the candidate corpus to the existing corpora based on a result of applying the at least one filter, add the candidate corpus to the existing corpora to form modified corpora; and
perform the NLP operation using the modified corpora.

14. The computer program product of claim 13, wherein the at least one filter comprises a second filter to determine whether information can be extracted accurately from the new corpus based on general quality metrics of the candidate corpus, and wherein applying the second filter comprises:

collecting the general quality metrics from the candidate corpus, wherein the general quality metrics comprise at least one of a number of good quality sentences, a number of acronyms, cluster of data types in an interested space, accuracy of an English Slot Grammar parser, a volume of data, or document structures; and
comparing the general quality metrics to a set of prerequisites for adding the candidate corpus to the existing corpora.

15. The computer program product of claim 13, wherein applying the first filter further comprises:
- collecting statistics about scope or type of incorrectly answered questions using the current corpora;
- generating the set of questions based on the statistics;
- determining a fraction of documents in the candidate corpus that cover the questions; and
- comparing the fraction of documents in the candidate corpus that cover the set of questions to the set of prerequisites for adding the candidate corpus to the existing corpora.

16. The computer program product of claim 13, wherein the at least one filter comprises a third filter to determine whether documents in the candidate corpus contain NLP features known to be helpful for performing the NLP operation and wherein applying the third filter comprises:
- extracting a set of the most frequent NLP features from a combination of the current corpora and candidate corpus;
- examining evidence and candidate answers for questions answered correctly and incorrectly using the combination of the current corpora and candidate corpus;
- determining a set of most effective features from the set of the most frequent NLP features using a machine learning model based on the evidence and candidate answers;
- determining a number of the set of most effective features that are present in the candidate corpus; and
- comparing the number of the set of most effective features that are present in the candidate corpus to the set of prerequisites for adding the candidate corpus to the existing corpora.

17. The computer program product of claim 13, wherein determining features associated with high-confidence evidence documents within the current corpora comprises labeling desired documents in the current corpora that show up as evidence for answers with high confidence and extracting features from metadata of the labeled desired documents to form the desired features; and
- wherein determining misleading features associated with misleading documents within the current corpora comprises labeling misleading documents in the current corpora that show up as evidence for incorrect answers and extracting features from metadata of the labeled misleading documents to form the misleading features.

18. The computer program product of claim 13, wherein applying the first filter further comprises determining a fraction of documents in the candidate corpus that match the desired features and cover the set of questions and comparing the fraction of documents in the candidate corpus that match the desired features and cover the set of questions to the set of prerequisites for adding the candidate corpus to the existing corpora.

19. An apparatus comprising:
- a processor; and
- a memory coupled to the processor, wherein the memory comprises instructions which, when executed by the processor, cause the processor to:

apply at least one filter to a candidate corpus to determine a degree to which the candidate corpus supplements existing corpora for performing a natural language processing (NLP) operation, wherein the at least one filter comprises a second filter to determine whether the candidate corpus contains documents having attributes that match a set of evidence documents that are known to provide high-confidence evidence and contains documents that cover a set of questions not sufficiently covered by the current corpora and wherein applying the second filter comprises:
- determining desired features associated with high-confidence evidence documents within the current corpora;
- determining misleading features associated with misleading documents within the current corpora, wherein the misleading documents provide evidence for low-confidence or incorrect answers;
- determining a fraction of documents in the candidate corpus that match the desired features and a fraction of documents in the candidates corpus that match the misleading features; and
- comparing the fraction of documents in the candidate corpus that match the desired features and the fraction of documents in the candidate corpus that match the misleading features to a set of prerequisites for adding the candidate corpus to the existing corpora;
- responsive to a determination to add the candidate corpus to the existing corpora based on a result of applying the at least one filter, add the candidate corpus to the existing corpora to form modified corpora; and
- perform the NLP operation using the modified corpora.

20. The apparatus of claim 19, wherein applying the first filter further comprises:
- collecting statistics about scope or type of incorrectly answered questions using the current corpora;
- generating the set of questions based on the statistics;
- determining a fraction of documents in the candidate corpus that cover the set of questions; and
- comparing the fraction of documents in the candidate corpus that cover the set of questions to the set of prerequisites for adding the candidate corpus to the existing corpora.

* * * * *